United States Patent [19]

Moracz

[11] Patent Number: 4,999,093

[45] Date of Patent: Mar. 12, 1991

[54] ELECTROCHEMICAL MACHINE ELECTRODE ASSEMBLY

[75] Inventor: Donald J. Moracz, Garfield Heights, Ohio

[73] Assignee: Compressor Components Textron Inc., Cleveland, Ohio

[21] Appl. No.: 345,576

[22] Filed: May 1, 1989

[51] Int. Cl.$^5$ .......................... B23H 9/10; B23H 3/04
[52] U.S. Cl. .............. 204/129.1; 204/224 M; 204/225; 204/289
[58] Field of Search ................. 204/129.1, 224 M, 225, 204/286, 288, 289; 219/69.15

[56] References Cited

U.S. PATENT DOCUMENTS

| | | | |
|---|---|---|---|
| 3,058,895 | 10/1962 | Williams | 204/143 |
| 3,459,645 | 8/1969 | Wilson et al. | 204/224 M X |
| 4,052,284 | 10/1977 | Schrader | 204/225 |
| 4,100,388 | 7/1978 | Meyer | 219/69.15 X |
| 4,104,503 | 8/1978 | Di Piazza et al. | 219/69.15 |
| 4,256,555 | 3/1981 | Wilson et al. | 204/225 X |

*Primary Examiner*—Donald R. Valentine
*Attorney, Agent, or Firm*—Reising, Ethington, Barnard, Perry & Milton

[57] ABSTRACT

An electrode or cathode assembly includes at least one electrode moveable relatively toward a workpart such as a turbine blade. The electrode includes a primary work face for machining the airfoil portion of the turbine blade. The electrode further includes secondary workfaces transverse to the primary workface for machining the shroud portion and the platform portion of the turbine blade which extend at negative angles transverses to the airfoil portion of the turbine blade. The primary workface comprises upper and lower electrode portions each having a plurality of fingers. The fingers of the upper electrode portion are alternatively disposed among the fingers of the lower electrode portion such that the opposing fingers interleave side by side with one another when the primary workface is closed. The fingers of the upper and lower electrode portions are expanded or moved in opposite directions to locate the secondary workface in a machining position adjacent the shroud portion and the platform portion of the turbine blade. The electrode is advanced toward the airfoil to locate the primary workface in a machining position adjacent the airfoil portion of the turbine blade.

18 Claims, 3 Drawing Sheets

ELECTROCHEMICAL MACHINE ELECTRODE ASSEMBLY

FIELD OF THE INVENTION

The present invention relates to an electrode assembly and a method for electrochemical machining and, in particular, to an electrode assembly especially useful, although not limited to, simultaneously machining an airfoil, shroud and root platform of a gas turbine blade or vane or other complex, curved shape in a single work stroke of the electrode assembly. The present invention is particularly useful for simultaneously machining the airfoil, shroud and root platform where the shroud and/or root platform surfaces are at negative angles to the direction of electrode movement.

BACKGROUND OF THE INVENTION

Turbine engine blades typically comprise an airfoil portion having concave and convex sides which extend upwardly from a platform portion below which a root portion is disposed. The platform portion extends transversely of the airfoil portion and may have an arcuate profile. The root portion of the blade is normally attached to a rotor disk. Further, an outer shroud portion may extend transversely across the airfoil portion at the end of the airfoil portion opposite the root portion. The shroud portion has an arcuate profile (e.g., a circular arc profile). Because of the arcuate profile of the platform and shroud portions as well as their transverse orientation relative to the airfoil portion, previous cathode assemblies useful to electrochemically machine turbine blades were unable to simultaneously machine the airfoil portion, platform portion, and the shroud portion, especially when the platform portion and/or the shroud portion have negative angles relative to the first direction of movement of the electrode.

U.S. Pat. No. 4,256,555 to Wilson et al, issued Mar. 7, 1981 illustrates an electrode assembly for electrochemically machining an airfoil portion and platform portion of a gas turbine engine blade. The assembly includes a pair of electrodes moveable relatively toward each other and toward a workpart, or airfoil, therebetween. The electrodes simultaneously machine the workpart and the platform directly above the root portion. The electrodes are moveable relatively toward the workpart in a first direction toward the workpart. However, by utilizing such an electrode assembly, it is impossible to simultaneously electrochemically machine the airfoil, platform portion and a shroud portion, especially when the platform portion and shroud portion have an arcuate profile and negative angles relative to the direction of electrode movement.

SUMMARY OF THE INVENTION AND ADVANTAGES

According to the present invention, there is provided an electrode assembly for machining a workpart having a first surface to be machined and a second surface to be machined which is transverse to the first surface. The assembly comprises at least one electrode for moving in a first direction between a retracted position remote from the workpart and a machining position adjacent the workpart for machining the workpart. The assembly is characterized by the electrode having a primary workface for machining the first surface of the workpart and a secondary workface transverse to the primary workface for machining the second surface of the workpart. The primary workface is expandable transversely of the first direction between a contracted position and an expanded position for positioning the secondary workface in a machining position adjacent the second surface of the workpart. The transverse second surface of the workpart may have negative angle to the first workpart surface and the first direction of electrode movement.

In a preferred working embodiment, the electrode primary workface has first and second portions. Each portion includes a plurality of laterally spaced apart fingers. Each of the fingers of the first workface portion are alternately disposed among the fingers of the second workface portion and interleave in side by side fashion when the electrode is in the contracted position. Further, the assembly includes expansion means associated with the first and second workface portions for moving the workface between the expanded and contracted positions.

A method for electrochemically machining a workpart is also provided. The method firstly comprises the step of supporting a workpart having a first surface to be machined and a second surface to be machined which is transverse to the first surface and which may be oriented at a negative angle relative to the first workpart surface and the first direction of electrode movement. An electrode having a primary workface and a secondary workface transverse to the primary workface is relatively moved in a first direction from a retracted position remote from the workpart to a machining position adjacent and spaced from the workpart for machining the workpart. The method is characterized by expanding the primary workface in a direction transversely of the first direction from a contracted position to an expanded position for positioning the secondary workface in a machining position adjacent the second surface of the workpart.

Accordingly, there is provided a method and electrode assembly which are capable of simultaneously machining a workpart such as a turbine blade, having an airfoil portion, an arcuate shroud portion extending transversely to the airfoil portion, and a platform portion extending transversely to the airfoil portion at the opposite end from the shroud portion. In a preferred embodiment, the invention provides a method and electrode assembly which are capable of simultaneously machining an airfoil portion as well as a shroud portion and platform portion that extend at negative angles relative to the direction of electrode movement.

BRIEF DESCRIPTION OF THE DRAWINGS

Other advantages of the present invention will be readily appreciated as the same becomes better understood by reference to the following detailed description when considered in connection with the accompanying drawings wherein:

In FIG. 6, like features of the apparatus of FIGS. 1-2 are represented by like reference numerals primed.

DETAILED DESCRIPTION OF THE INVENTION

Figure 1:
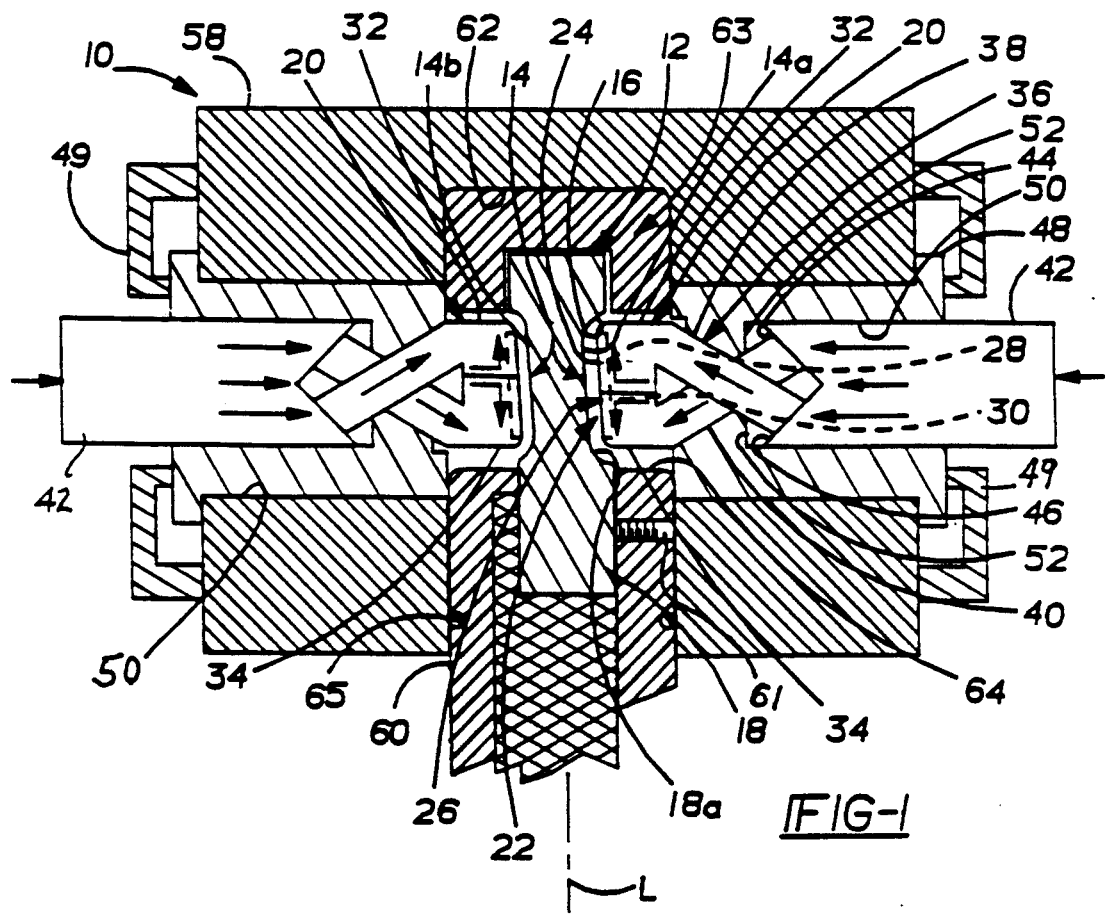
FIG. 1 is a side view partially in cross section of the electrode assembly of the present invention showing the workface in the contracted position but in simplified configuration for purposes of clarity.

An electrode assembly made in accordance with the present invention is generally shown at 10 in the Figures. The electrode assembly is useful for machining a metallic workpart 12 such as a turbine blade or vane preform 12. The workpart 12 is preferably a preform having a rough oversized shape relative to the desired finish machined blade or vane 12. The preform can be made by forging the workpart 12 to the desired near net shape. Other fabrication techniques, such as casting, can also be used to make the preform 12. However, the invention is not limited to machining near net shapes.

The workpart 12, or preform 12, has a first surface 14 with opposite sides 14a, 14b to be machined. This first surface 14 comprises the airfoil portion 14 of the turbine blade 12 known to those skilled in the art. Opposite sides 14a, 14b correspond to the typical respective concave and convex sides of the airfoil portion 14, FIG. 4A,4B. The workpart 12 further has a second surface 16 to be machined which is transverse to the first surface 14. This second surface 16 is the shroud portion 16 of the turbine blade 12. The shroud portion 16 extends generally transverse to the airfoil portion 14 and has an arcuate profile. The shroud 16 extends across an outer end of the airfoil 14 such that the airfoil 14 extends radially inwardly from the accurate shroud 16. Further, the turbine blade 12 has a root portion 18 with a platform portion 18a extending transversely of the airfoil portion 14 at the opposite end from the shroud portion 16. The platform portion 18a may include an arcuate profile as shown.

The assembly 10 includes at least one electrode generally indicated at 20. Preferably, a pair of metal electrodes 20 are included. The electrodes 20 are moveable in opposite directions toward opposite sides 14a, 14b of the preform 12 therebetween to machine the sides 14a, 14b to a final shape and dimension. Each of the electrodes 20 is preferably made of copper, stainless steel and the like.

Figure 2:
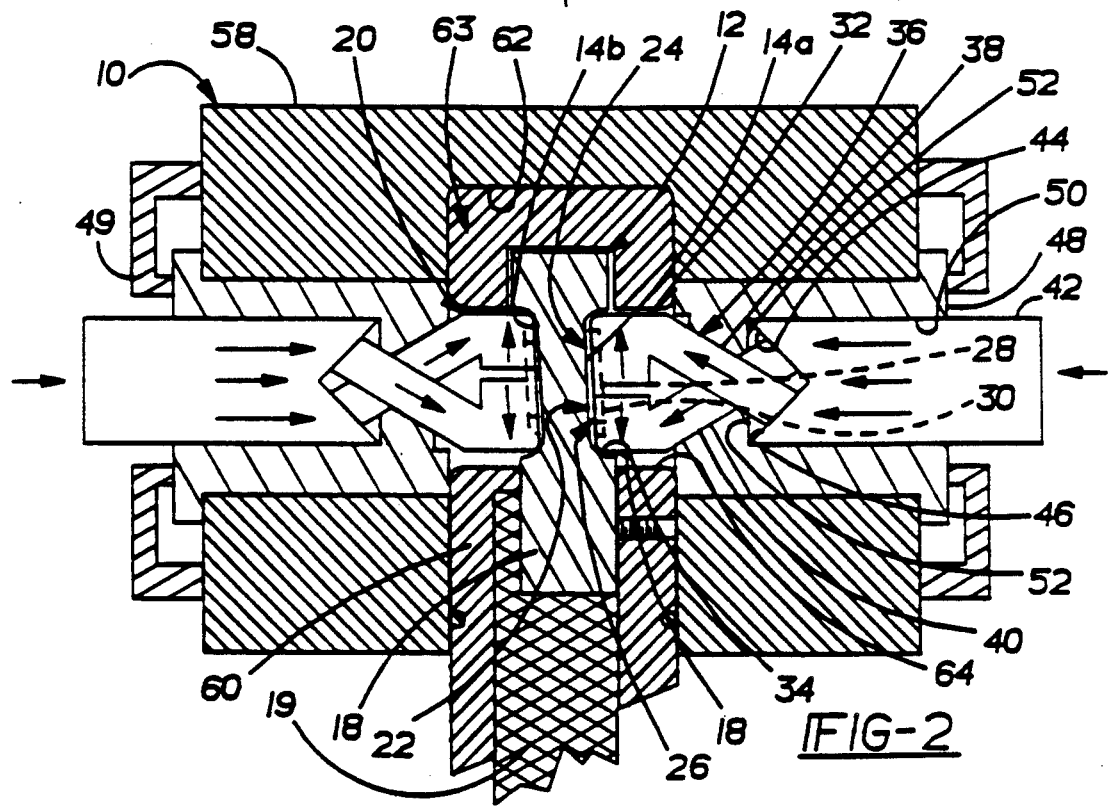
FIG. 2 is a side view, partially in cross section, of the electrode assembly showing the workface in the expanded position at the machining position but in simplified configuration for purposes of clarity.

Each of the electrodes 20 moves in a first direction toward the respective side 14a and 14b of the airfoil portion 14. This first direction is substantially transverse to the stacking line or longitudinal axis L or the airfoil portion 14 of the workpart 12. The electrodes 20 are moveable along the first direction between a retracted position remote from the preform 12, FIG. 1, and a machining position adjacent and spaced from the workpart (as shown in FIG. 2) for machining opposite sides 14a, 14b of the workpart 12. Typically, a generally constant width gap or space in provided between each electrode 20 and the respective surface of the workpart to be machined by suitably configuring the electrode workfaces to be described hereinbelow. When the electrode 20 is in the remote position, it is relatively far from the workpart 12, and no machining takes place on the workpart 12 when the electrode 20 is in this remote position.

Each electrode 20 is moved or stroked along the first direction from the retracted position to the machining position adjacent and spaced from the workpart 12 to machine the opposite sides 14a, 14b of the airfoil portion 14. During such movement, a suitable voltage is provided between the electrodes 20 and the workpart 12 as electrolyte flows therebetween such that the electrodes 20 are cathodes relative to the workpart 12 which is made an anode.

Each electrode 20 includes a primary workface, generally shown at 22. Each primary workface 22 is configured to machine the respective convex or concave side 14a, 14b of the airfoil portion 14 of the workpart 12; e.g., see FIG. 4A,4B which show a typical detailed configuration for the primary workfaces 22. The primary workfaces 22 are shown simplified in FIGS. 1, 2 and 6 for purposes of clarity.

Figures 4A, 4B:
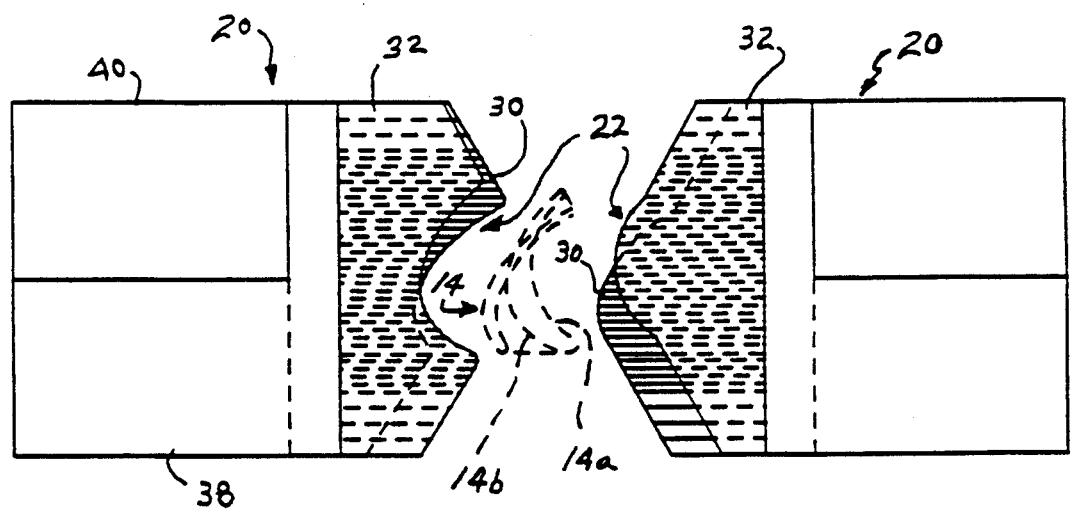
FIG. 4A, 4B is a top view of a typical electrode assembly of the present invention with the primary workfaces 22 shown in detail configured to machine the convex and concave sides of the airfoil portion of the preform. The airfoil portion 14 is shown in detail to include the convex and concave sides and the usual longitudinal twist from the root toward the shroud thereof.

One primary workface 22 is configured to machine the convex side of the airfoil portion 14, e.g., see FIG. 4A, while the other primary workface 22 is configured to machine the concave side of airfoil 14, e.g., see FIG. 4B. Each primary workface 22 is expandable transversely of the first direction of travel of the electrode 20 between a contracted position and an expanded position. In the expanded position, each primary workface 22 has an increased dimension parallel to the axis L of the airfoil portion 14 and transversely of the first direction of travel of each electrode 20.

Figure 3:
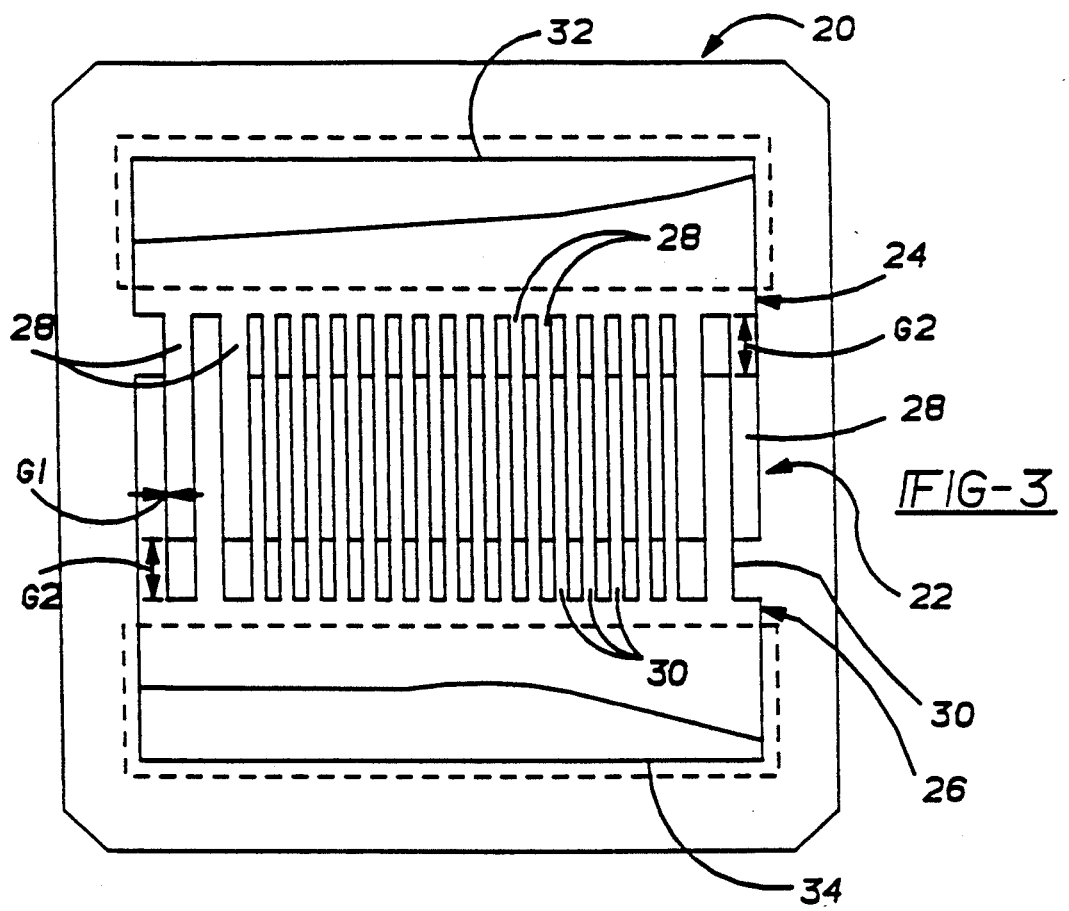
FIG. 3 is a front view of the workface of one of the electrodes with fingers shown in solid in the expanded position and in phantom in the contracted position.

More particularly, each primary workface 22 comprises an upper (first) electrode portion generally indicated at 24 and a lower (second) electrode portion generally indicated at 26. The upper electrode portion 24 and lower electrode portion 26 are moveable with respect to one another along the direction of expansion which is transverse to the first direction of movement of the electrode 20. Specifically, the upper and lower electrode portions 24, 26 have a plurality of laterally spaced apart fingers 28, 30, respectively. Each of the fingers 28, 30 extends generally parallel to the next adjacent finger 28, 30. The fingers 28 of the upper electrode portion 24 are alternately disposed among the fingers 30 of the lower electrode portion 26. The fingers 28 interleave or nest with the fingers 30 in close side-by-side relationship to one another when the primary work face 22 is in the contracted or nested position. As shown best in FIG. 3, the outermost of the fingers 28, 30 on each electrode portion have greater lateral widths (e.g., 0.12 inch) than the innermost of the fingers 28, 38 which have a lesser lateral width (e.g., 0.04 inch). The lateral gap G1 between the interleaved fingers 28, 30 is relatively small (e.g., about 0.003 inch) so as not to adversely affect machining of the airfoil sides 14a, 14b. Moreover, the vertical gap G2 (FIG. 3) between electrode portions 24, 26 is minimal when the electrode is in the contracted position. The vertical gap G2 increases when the fingers 28, 30 are spaced apart as the electrode moves from the contracted position to the expanded position and is a function of the height of the platform portion and the shroud portion. This vertical gap G2 may create some ripple effects on the machined opposite sides 14a, 14b of the airfoil portion 14. This ripple effect can be removed by polishing the sides 14a, 14b subsequent to electrochemical machining using the electrodes 20.

Each electrode 20 further includes an upper secondary workface 32 which is oriented transverse to each respective primary workface 22. As shown in FIG. 1, the upper secondary workface 32 extends transversely to and rearwardly from the top of the respective primary workface 22. The upper secondary workface 32 is configured to machine the shroud surface 16 of the turbine blade 12. When the electrode 20 is in the machining position and the primary workface 22 is in the expanded position, the upper secondary workface 32 is positioned in a machining position adjacent and spaced from the second surface or shroud surface 16 of the workpart 12.

Further, each electrode 20 includes a lower secondary workface 34. Each lower secondary workface 34 also extends transverse to the respective primary workface 22. The lower secondary workface 34 is located at the opposite end of the electrode 20 from the upper secondary work face 32. That is, the lower secondary workface 34 extends from the bottom of the electrode 20 and rearwardly therefrom. The lower workface 34 is configured to machine the platform portion 18a of the root portion 18.

The assembly 10 further includes an expansion means generally indicated at 36 cooperatively associated with each electrode 20 for moving the respective primary workface 20 between the contracted and the expanded positions. Specifically, each expansion means comprises a first arm 38 extending rearwardly from the upper electrode portion 24. The first arm 38 extends rearwardly and downwardly from the upper electrode portion 24. The expansion means 36 further comprises a second arm 40 extending rearwardly and upwardly from the lower electrode portion 26. Thus, each of the support arms 38, 40 extend rearwardly and away from the respective primary work face 22.

Each expansion means further comprises a drive ram 42. The drive ram 42 has a generally V-shaped forward surface defining upper and lower ram surfaces 44, 46. The first support arm 38 slideably engages the lower ram guide surface 46. Similarly, the second support arm 40 slideably engages the upper ram guide surface 44. The support arms 38, 40 are slideably retained by the respective ram surfaces 46, 44 by utilizing close tolerance sliding engagement therebetween. Thus, the arms 38, 40 are slideable only relative to the surfaces 44, 46. One such arrangement is to have the first support arm 38 and second support arm 40 keyed to the respective ram surface 46, 44. In this manner, the first arm 38 can slide relative to the lower surface 46 and the second arm 40 can slide relative to the upper ram surface 44. Movement in the first direction of the electrode 20 by the drive ram will be transmitted from the drive ram to the electrode 20 by the arms 38, 40.

Each electrode 20 and its associated expansion means 36 are housed by a common support structure 48. The support structure 48 has coaxial bores 50 therethrough for slideably supporting each drive ram 42. Further, the support structure 48 has a pair of flanges 52 extending therefrom and into each bore 50. The flanges 52 are configured to slidably engage and guide the support arms 38, 40 while the electrode is being moved from the retracted position to the machining position as previously described. That is, as the support arms 38, 40 of each electrode 20 are moved by the respective drive ram 42, the support arms engage the flanges 52 and their movement is guided thereby.

The movement of the arms 38, 40 of each electrode 20 as imposed by associated drive ram 42 causes each primary workface 22 to move between the expanded and contracted positions. Specifically, with reference to FIG. 1, as an external force is applied to each drive ram 42 to move the electrode 20 in the first direction from the retracted position remote from the workpart 12 toward the machining position adjacent and spaced from the workpart 12, the first arm 38 engages the lower ram surface 46. The movement of the ram 42 causes the first arm 38 to engage the lower flange 52. The first arm 38 moves along the lower ram surface 46 and at the other end, this movement causes the upper electrode portion 24 to move transversely of the movement of the drive ram 42. This movement positions the upper secondary workface 32 adjacent and spaced from the shroud portion 16 of the turbine blade 12 for machining. Similarly, the second arm 40 engages the upper flange 52 and moves relative to the upper ram surface 44. This causes the lower electrode portion 26 to move transversely of the movement of the drive ram 42 and in the opposite direction of movement of the upper electrode portion 24. This movement positions the lower secondary workface 34 adjacent and spaced from the platform portion 18a of the turbine blade 12 for machining. As an external force is applied to the drive ram 42 along the first direction to move the electrode 20 from the machining position to the retracted position, the movement previously described is reversed and movement of the arms 38, 40, as guided by the flanges 52, causes the respective upper 24 and lower 26 electrode portions to return to the contracted or nested position.

As is evident from the preceeding description, movement of each primary workface 22 from the contracted position to the expanded position occurs simultaneously with the movement of each electrode 20 from the retracted position to the machining position. Similarly, movement of each primary workface 22 from the expanded position to the contracted position occurs simultaneously with the movement of each electrode 20 from the machining position to the retracted position. It is appreciated, however, that this is not the only means by which the primary workfaces 22 can be moved between the expanded and contracted positions. For instance, each electrode 20 can be positioned in the machining position and then the primary workfaces 22 can be expanded by any means. Thus, movement of the primary workfaces 22 between the expanded and contracted positions can occur simultaneously with movement of each electrode 20 between the retracted and machining positions. Alternatively, such movement of the primary workface 22 can be independent of movement of the electrode 20 between the retracted and machining positions.

The electrode assembly 10 is adapted for use in an electrochemical machine having a main housing 58 with a central opening 62 therein. The main housing has the support structure 48 held therein by collars 49 (schematically shown) fastened to the housing 58 using suitable fastening means. The machine further includes shuttle means movably received in opening 62. The shuttle means comprises a shuttle 60 which engages and supports workpart 12. One or more set screws 61 may be used to lock the workpart 12 in position on the shuttle 60 with the root 18 connected to electrical strap 19 or other electrical connector. The shuttle member 60 provides positioning of the workpart 12 in the central opening 62 for machining the workpart 12 with the shroud end 12a of the workpart received in a stationary U-shaped cage 63 disposed in opening 62. Shuttle 60 and cage 63 are made of electrical insulating material. Finally, the shuttle 60 removes the finish machined workpart 12 from the central opening 62. One or more sealing gaskets 65 may be provided between the shuttle 60 and the housing 58 for electrolyte sealing purposes. Suitable actuator means, (not shown) is provided to move the shuttle 60. The machine further includes electrical supply means (not shown) connected between the workpart 12 and electrodes 20 in such a manner as to make the workpart 12 an anode with respect to the electrodes 20 which are cathodes. The electrical supply means can be of any well known type for providing the proper voltage between the workpart and the electrodes 20. The electrical contact with each electrode 20 is preferably made at the rams 42 which are electrically conductive to this end. It is appreciated that the connection is not limited to being at the drive ram. For example, the electrical connection can be made directly to each electrode.

Finally, the machine includes an electrolyte supply mean which includes an inlet slot (not shown) adjacent the leading edge of the airfoil portion 14 for introducing electrolyte, such as an aqueous salt solution, to flow in the space between each electrode 20 and the workpart 12 during machining chordwise of the airfoil portion 14 from the leading edge to the trailing edge thereof. The electrolyte is exhausted through an outlet slot (not shown) adjacent the trailing edge of the airfoil portion 14.

In accordance with the method of the invention, the preform 12 is fixedly secured in the shuttle 60 by set screw 61. The workpart 12 is then transferred (by movement of the shuttle 66) into a central opening 62 in the main housing 58. The electrodes (cathodes) 20 are initially in the retracted position remote from the preform blade 12. Eletrolyte is then pumped through the passageway 64 and the preform 12 is made anodic relative to the electrodes 20 by application of a suitable voltage therebetween. An external drive force is applied to each drive ram 42 thereto. Each drive ram 42 moves along the first direction and moves the associated electrode 20 from the remote position to the machining position adjacent the opposite sides 14a, 14b of the airfoil portion 14. As each electrode 20 moves toward the airfoil portion 14, the support arms 38 and 40 slide relative to the ram surfaces 44, 46 and engage the flanges 52 thereby spreading the fingers 28, 30 of each primary workface 22 relative to one another and causing each primary workface 22 to move to the expanded position. With each primary workface 22 in the expanded position, each upper secondary surface 32 is placed adjacent and spaced from the upper secondary surface or shroud surface 16 of the workpart 12 and each lower secondary workface is placed adjacent and spaced from the lower platform portion 18a of the root portion 18. In this manner, the opposite sides 14a, 14b of the airfoil 14, the shroud surface 16, and platform portion 18a can be simultaneously machined. Once the machining operation is completed, an external drive force is applied to the ram 42 in the direction away from the workpart 12. The support arms 38, 40 slide relative to the ram surfaces 44, 46 thereby retracting electrode 20 and moving the primary work face 22 from the expanded position to the contracted or nested position. The shuttle 60 then removes the finished workpart 12 from the main housing 58.

Figure 5:
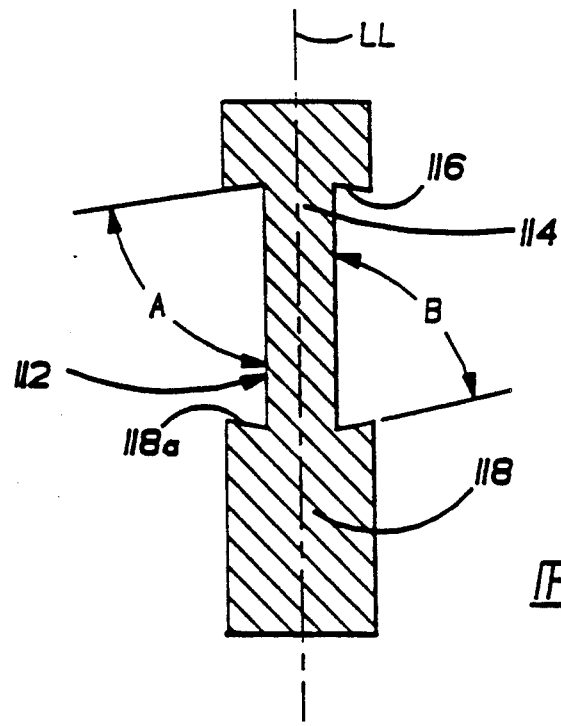
FIG. 5 is a longitudinal cross-sectional view of a gas turbine engine blade or vane having a shroud portion and platform portion with negative shelf angles.

The electrode assembly of the invention is especially useful in simultaneously electrochemically machining the airfoil portion 114 as well as the shroud portion 116 and platform portion 118a (on root portion 118) of a gas turbine blade or vane preform 112 wherein the shroud portion 116 an platform portion 118a extend transversely at what are considered within the description the invention respective negative angles A and B (so-called shelf angles) relative to the longitudinal axis or stacking line LL of the preform 112 as shown in FIG. 5. This type of preform 112 is to be compared with preform 12 shown in FIGS. 1 and 2 wherein the shroud portion 16 and platform portion 18a extend transversely at what are considered within the description of this invention as positive angles (so-called shelf angles) relative to the longitudinal axis or stacking line L of the preform 12.

Figure 6:
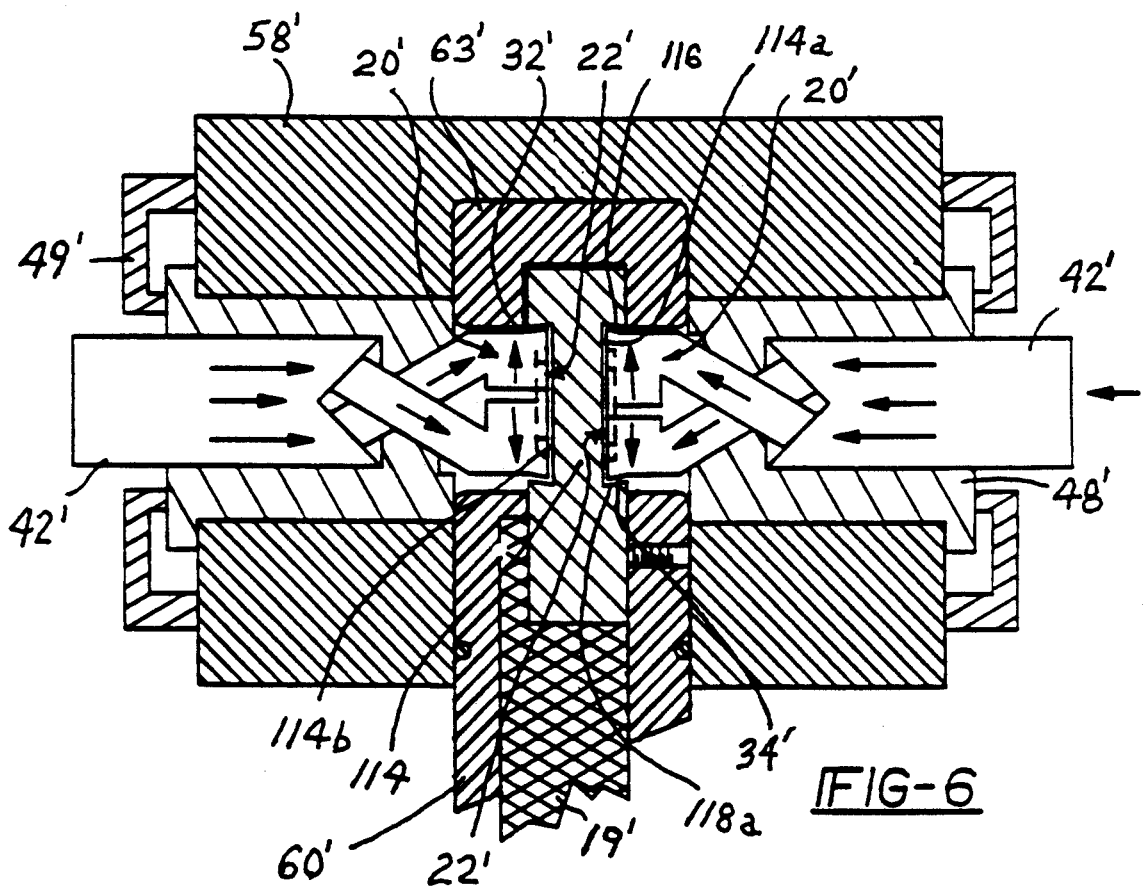
FIG. 6 is a side view, partially in cross-section, of the electrode assembly of another embodiment of the invention adapted to machine the blade or vane of FIG. 5 and showing the workface in the expanded position at the machining position but in simplified configuration for purposes of clarity.

FIG. 6 wherein like features of FIGS. 1-2 are represented by like reference numerals primed) illustrates the preform 112 and electrodes 20' of the invention adapted to machine the preform 112 with the electrodes 20' in a machining position adjacent and spaced from the airfoil portion 114, shroud portion 116 and platform portion 118a. The electrodes 20' are generally similar to the electrodes 20 disclosed and illustrated hereinabove with respect to figures 1-4 with the exception that the upper secondary workface 32' and the lower secondary workface 34' of each electrode 20' have a tapered profile that will impart the desired negative shelf angle A and B to the shroud portion 116 and platform portion 118a during electrochemical machining thereof when each electrode 20' is expanded (by expansion means 36, FIGS. 1-2) to the expanded position so as to position the upper and lower secondary workfaces 32',34' in a machining position adjacent and spaced from the shroud portion 116 and the platform portion 118a, respectively. As in the embodiment of the invention described hereinabove with request to FIGS. 1-4, the opposite sides 114a, 114b of the airfoil portion 114 are electrochemically machined by the primary workfaces 22' on each electrode 20' generally simultaneously with machining of the shroud portion 116 and the platform portion 118a by the upper and lower secondary workfaces 32', 34' of each electrode 20'.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention ma be practiced otherwise than as specifically described.

What is claimed is:

1. An electrode assembly for machining a workpart having a first surface to be machined and a second surface to be machined which is transverse to the first surface, comprising: at least one electrode for moving in a first direction between a retracted position remote from the workpart and a machining position adjacent the workpart for machining the workpart, said electrode having a primary workface for machining the first surface of the workpart and a secondary workface oriented transverse to said primary workface, said primary workface having first and second electrode portions movable relative to one another in opposite directions transverse of said first direction between a contracted position and an expanded position for positioning the secondary workface in a machining position adjacent the second surface of the workpart, said first and second electrode portions having a plurality of fingers interleaved side-by-side with one another when said primary workface is in said contracted position.

2. An assembly as set forth in claim 1 wherein said electrode includes another secondary workface oriented transverse to said primary workface, said another secondary workface being disposed on an opposite side of said primary workface from said secondary workface for positioning as a result of expansion of said primary workface adjacent a third surface of the workpart that is oriented transverse to the first surface.

3. An assembly as set forth in claim 1 further characterized as including expansion means for moving said first and second electrode portions between said contracted and said expanded positions.

4. An assembly as set forth in claim 3 further characterized by said expansion means comprising a first arm extending from said electrode portion and a second arm extending from said second electrode portion, each of said arms extending away from said primary workface, and a drive ram for slideably engaging said first and second arms.

5. An assembly as set forth in claim 4 further characterized by said drive ram having a generally V-shaped forward surface defining first and second ram surfaces, said first arm engaging said first ram surface and said second arm engaging said second ram surface.

6. An assembly as set forth in claim 5 further characterized as including a support housing, said housing having a bore therethrough for slideably supporting said drive ram.

7. An assembly as set forth in claim 6 further characterized by said support housing having a pair of flanges extending therefrom, said flanges for engaging and guiding said first and second arms.

8. An assembly as set forth in claim 7 further characterized by each of said fingers extending generally parallel to the next adjacent of said fingers.

9. An electrode assembly for machining a workpart comprising: at least one electrode for moving in a first direction between a retracted position remote from the workpart and a machining position adjacent the workpart for machining the workpart, said electrode having a workface expandable transversely of said first direction between a nested position and an expanded position for increasing the dimension of said workface in said transverse direction, said workface comprising first and second electrode portions each having a plurality of fingers, said fingers of said first electrode portion being alternately disposed among said fingers of said second electrode portion such that said opposing fingers interleave side by side with one another when said workface is in said nested position.

10. An apparatus for electrochemically machining a workpart having a first surface to be machined and a second surface to be machined which is transverse to the first surface comprising:
a housing having an opening therein;
shuttle means for supporting the workpart and positioning said workpart in said opening of said housing;
at least one electrode for moving in a first direction between a retracted position remote from the workpart and a machining position adjacent the workpart for machining the workpart;
electrical supply means for making said electrode a cathode with respect to the workpart;
electrolyte supply means for supplying an electrolyte between said workpart and said electrode while said electrode is in said machining position;
said electrode having a primary workface for machining the first surface of the workpart and a secondary workface oriented transverse to said primary workface, said primary workface having first and second electrode portions movable relative to one another in opposite directions transverse of said first direction between a contracted position and an expanded position for positioning the secondary workface in a machining position adjacent the second surface of the workpart, said first and second electrode portions each having a plurality of fingers, said fingers of said first electrode portion being alternately disposed among said fingers of said second electrode portion such that said opposing fingers interleave side by side with one another when said primary workface is in said contracted position.

11. In a method for electrochemically machining a workpart having a first surface to be machined and a second surface to be machined which is transverse to the first surface, the steps of:
relatively moving the workpart and an electrode having a primary workface and a secondary workface oriented transverse to the primary workface in a first direction to place the primary workface in a machining position adjacent the first surface of the workpart for machining said first surface, said primary workface comprising first and second electrode portions having a plurality of fingers disposed side-by-side in a contracted position; and
moving the fingers of the first electrode portion and second electrode portion away from one another to expand the primary workface in a direction transverse of the first direction from the contracted position to an expanded position for positioning the secondary workface in a machining position adjacent the second surface of the workpart for machining said second surface.

12. A method as set forth in claim 11 further characterized by making the workpart an anode relative to the electrode for machining the workpart.

13. A method as set forth in claim 11 further characterized by supplying an electrolyte between the workpart and the electrode.

14. A method as set forth in claim 11 further characterized by positioning another secondary workface of said electrode adjacent a third surface of the workpart to be machined by expanding the primary workface.

15. In a method for electrochemically machining a workpart having a longitudinal axis, a longitudinally extending first, airfoil configured surface to be machined and a second surface to be machined which extends transversely of said first surface at a negative angle to said axis, said second surface comprising one of a shroud or platform configured surface, the steps of:

relatively moving the workpart and an electrode having a primary workface and a secondary workface oriented transverse to the primary workface in a first direction to place the primary workface in a machining position adjacent the first surface of the workpart for machining said first surface; and expanding the primary workface in a direction transversely of the first direction from a contracted position to an expanded position for positioning the secondary workface in a machining position adjacent the second surface of the workpart for machining said second surface.

16. A method as set forth in claim 15 wherein said workpart includes a third surface to be machined which extends transversely of said first surface at a negative angle to said axis on an opposite side of said first surface, said third surface comprising the other of a shroud or platform configured surface, said electrode including another secondary workface which is placed in a machining position adjacent the third surface of the workpart for machining said third surface when said primary workface is expanded from the contracted position to the expanded position.

17. A method as set forth in claim 15 wherein said workpart comprises a gas turbine blade or vane.

18. In a method for electrochemically machining a workpart, the steps of:

relatively moving the workpart and an electrode having a primary workface in a first direction to position the primary workface in a machining position adjacent the workpart, said primary workface comprising first and second electrode portions having a plurality of fingers thereon disposed side-by-side in a contracted position;

and moving the fingers of the first electrode portion and the second electrode portion away from one another to expand the primary workface in a direction transverse of the first direction from the contracted position to an expanded position for increasing the dimension of the primary workface in the transverse direction.

* * * * *